United States Patent
Lomp

(10) Patent No.: US 7,401,757 B2
(45) Date of Patent: Jul. 22, 2008

(54) FIXING ARRANGEMENT FOR VEHICLE ROOF MOUNTING OF AN AIR CONDITIONING MODULE

(75) Inventor: Dirk Lomp, Gilserberg-Moischeid (DE)

(73) Assignee: Konvekta AG, Schwalmstadt (DE)

( * ) Notice: Subject to any disclaimer, the term of this patent is extended or adjusted under 35 U.S.C. 154(b) by 605 days.

(21) Appl. No.: 11/080,738

(22) Filed: Mar. 15, 2005

(65) Prior Publication Data
US 2005/0204764 A1    Sep. 22, 2005

(30) Foreign Application Priority Data
Mar. 17, 2004    (DE) ................. 10 2004 012 917

(51) Int. Cl.
F16M 1/00    (2006.01)
B60R 9/00    (2006.01)
(52) U.S. Cl. .............. 248/681; 248/222.14; 248/680; 224/319; 224/329
(58) Field of Classification Search ......... 248/680–681, 248/222.13, 222.14, 222.52, 225.11; 224/319, 224/321, 329
See application file for complete search history.

(56) References Cited

U.S. PATENT DOCUMENTS

| | | | | |
|---|---|---|---|---|
| 3,366,295 A | * | 1/1968 | Nygaard | 224/319 |
| 3,731,956 A | * | 5/1973 | Hanley | 52/481.2 |
| 4,266,386 A | | 5/1981 | Bains | |
| 4,489,868 A | * | 12/1984 | Thirion | 224/321 |
| 5,132,666 A | * | 7/1992 | Fahs | 224/329 |
| 5,219,191 A | | 6/1993 | Wolter | |
| 5,464,140 A | * | 11/1995 | Hill | 224/321 |
| 5,667,116 A | * | 9/1997 | Reinhart et al. | 224/319 |
| 6,123,314 A | * | 9/2000 | Steele | 248/681 |
| 6,295,826 B1 | | 10/2001 | Lee | |
| 6,339,934 B1 | | 1/2002 | Yoon et al. | |
| 6,948,691 B2 | * | 9/2005 | Brock et al. | 248/222.13 |
| 2003/0110787 A1 | | 6/2003 | Koehler et al. | |
| 2005/0204764 A1 | * | 9/2005 | Lomp | 62/239 |

FOREIGN PATENT DOCUMENTS

| | | |
|---|---|---|
| DE | 38 18 224 C2 | 12/1989 |
| DE | 199 12 267 C2 | 8/1999 |
| DE | 198 06 690 A1 | 9/1999 |

OTHER PUBLICATIONS

English Abstracts Only for 3 German references.

* cited by examiner

*Primary Examiner*—Amy J Sterling
*Assistant Examiner*—Tan Le
(74) *Attorney, Agent, or Firm*—Synnestvedt & Lechner LLP

(57) ABSTRACT

Described is a fixing arrangement for releasably fixing an air conditioning module to the roof of a vehicle such as a rail vehicle. The module has opposite side surfaces from which first fixing projections project. The vehicle roof supports positioning rail members in mutually parallel relationship at a spacing from each other corresponding to the spacing between the side surfaces of the module. The positioning rail members have upwardly open first openings. Second fixing projections project from the positioning rail members at the outside thereof laterally beside the first openings. Locking rail members are adapted to co-operate with the positioning rail members, for which purpose the locking rail members have slots operatively associated with the second fixing projections and second upwardly open openings which are associated with the first openings and which have a portion extending in the longitudinal direction of the respective locking rail member for lockingly receiving the first projections on the positioning rail members.

12 Claims, 5 Drawing Sheets

FIXING ARRANGEMENT FOR VEHICLE ROOF MOUNTING OF AN AIR CONDITIONING MODULE

CROSS-REFERENCES TO RELATED APPLICATIONS

This application claims the priority of German patent application Serial No 10 2004 012 917.7 filed Mar. 17, 2004, the subject-matter of which is incorporated herein by reference.

FIELD OF THE INVENTION

The invention concerns a fixing arrangement for releasably fixing an air conditioning installation on a vehicle roof.

The air conditioning installation may be more specifically but not exclusively in the form of an autonomous module while the vehicle roof may be more especially but not exclusively the roof of a rail-mounted vehicle.

BACKGROUND OF THE INVENTION

An air conditioning installation more particularly for being removably positioned over the sun roof or the sliding roof of a motor vehicle will typically comprise an evaporator, a condenser, a compressor and a drive device for the compressor, with those components being disposed in a common housing. The housing of that installation can be releasably fixed to the roof of the vehicle by means of easily releasable fixing elements. Those fixing elements may be of the same kind as are used for example for roof racks, carriers for surfboards, roof carriers for bicycles, ski carriers and the like. A structure of that kind can be found in DE 35 31 045 A1.

A latching device for connecting two components of a motor vehicle to elongate support surfaces, more specifically for connecting a bumper to a fender, is disclosed in DE 199 12 267 C2. The first component carries at least two and preferably more mutually spaced latching pins while the second component carries a latching bar with latching openings associated with the latching pins, to provide mutual latching engagement. The latching pins each have a pin head with a pin latching opening which can be connected thereto. The second component has through openings associated with the latching pins. The latching bar is in the form of a displaceable bar which is mounted at the rear side of the second component at least indirectly while being longitudinally displaceable in the direction of the through openings. The displaceable bar has keyhole openings which are associated with the latching pins and which are oriented in the longitudinal direction of the bar, in such a way that, in an open position of the displaceable bar, the through openings are each aligned with the wider region of a keyhole opening for passing the associated pin head therethrough while in a displaced latching position of the displaceable bar it respectively engages with the slot region of a keyhole opening, which is narrower in relation to the pin head, behind the pin head which has been passed through the component as far as the pin latching opening, and latches into the associated pin latching opening in order to form the latching connection.

Reference may also be made to DE 198 06 690 A1 describing an arrangement for fixing a component to a carrier member having at least one elongate through opening which at one end has a region involving a greater width of opening while at the other end it has a region involving a smaller width of opening. The component has at least one holding portion formed by a shank projecting perpendicularly from the component and a head which projects transversely beyond the shank. That fixing arrangement is intended to permit quick and easy figment and removal and to ensure a secure fixing effect even after a number of fitting and removal procedures. That fixing arrangement achieves those aims insofar as the component has at least one latching element formed by a loop extending transversely with respect to the shank and resiliently yielding in the longitudinal direction thereof, and a latching projection arranged at the free end of the loop and projecting away from the component in the same direction as the holding portion. The latching projection engages into an opening arranged in the carrier member at a spacing from the through openings, when the shanks of the holding portions are disposed in the regions of the through openings which are of smaller widths.

Another fixing arrangement for the roof mounting of vehicle air conditioning installations comprising at least one blower unit communicating by way of a roof aperture with an air feed shaft of the vehicle and a bottom portion which in the mounted position faces towards the roof, is to be found in DE 38 18 224 C2. Disposed between the bottom portion of the air conditioning installation and the roof structure surrounding the opening in the roof is a sealing element which extends around the roof opening and which directly forms the communication between the air conditioning installation and the air feed shaft, the flexible sealing element being compressible upon fitment of the installation. In that case a plurality of screw bolts and rubber elements serving as spacers are additionally disposed between the bottom portion of the air conditioning installation and the roof structure. The rubber elements and the screw bolts can be combined together to constitute rubber mountings.

Attention may further be directed to U.S. Pat. No. 6,339,934 B1 disclosing an assembly for mounting an air conditioning installation on a vehicle roof. The roof has a roof opening in which a frame is fitted. The air conditioning installation is mounted on the frame. A one-piece floor plate is provided in the frame while arranged on that plate is an adjustable partitioning wall which subdivides the interior of the frame into two mutually separate compartments.

Reference may also be made to DE 101 61 254 A1 disclosing an air conditioning installation in the form of a flat autonomous module which has only one energy connection for a single form of energy. The energy connection preferably involves an electrical energy connection but it may for example also involve a hydraulic or pneumatic energy connection.

Particularly when dealing with rail-mounted vehicles such as railroad vehicles, the problem arises that, to repair or replace an air conditioning installation mounted on the roof of a railroad car, it is necessary for the car to be taken into a railroad repair workshop in order for the appropriate repair procedure to be implemented there. That however involves a considerable degree of logistical expenditure.

SUMMARY OF THE INVENTION

An object of the invention is to provide a fixing arrangement for releasably fixing an air conditioning module on a vehicle roof, which is so designed as to permit uncomplicated exchange of the module without taking a great deal of time.

Another object of the present invention is to provide a fixing arrangement for readily and quickly releasably fixing an autonomous air conditioning module on a vehicle roof involving a simple structure and an easy fitment and removal procedure.

Yet another object of the present invention is to provide a fixing arrangement for releasably mounting an autonomous air conditioning module to a rail vehicle roof which is so designed as to permit ready latching engagement in the mounting operation and easy disengagement upon removal so that module replacement can take place directly on site, on the railroad.

In accordance with the principles of the present invention the foregoing and other objects are attained by a fixing arrangement for releasably fixing an air conditioning installation, for example an autonomous air conditioning module, on the roof of a vehicle, for example a rail vehicle, comprising first fixing projections protruding from mutually opposite side surfaces of the installation or module. Positioning rail members are adapted to be fixed on the vehicle roof in mutually parallel relationship at a spacing from each other adapted to the spacing between the side surfaces of the module. The positioning rail members have first recesses or openings which are open upwardly in the mounted position of the positioning rail members on the roof, and second fixing projections protruding from the positioning rail members at the outside thereof laterally beside the first openings in the positioning rail members. The arrangement further includes locking rail members which are adapted in use to co-operate with the positioning rail members. The locking rail members each have slots adapted to be operatively associated with the second fixing projections on the positioning rail members, and second openings which are respectively adapted to be associated with the first openings of the positioning rail members and which in the mounted position are open upwardly, the second openings being of a configuration like a walking stick or a generally L-shaped configuration. For releasably securing the first fixing projections of the module in the first openings of the positioning rail members and in the second openings of the locking rail members, the positioning rail members and the locking rail members carry respective fixing securing means.

In accordance with a preferred feature of the invention, at least two first fixing projections respectively project from each of the mutually oppositely disposed side surfaces of the air conditioning module. This is intended to ensure that the module is reliably secured to the roof of the vehicle such as a railroad vehicle. In a further preferred configuration in that respect three first fixing projections respectively project from each of the opposite sides of the air conditioning module.

In a preferred feature of the invention, in the mounted position of use of the fixing arrangement the positioning rail members are oriented in the longitudinal direction of the vehicle roof and are of a length which is adapted to the length of the oppositely disposed sides of the module.

Preferably, the autonomous air conditioning module has a single energy connection, that is to say an energy connection for a single form of energy. The energy connection preferably involves an electrical energy connection. The air conditioning module is desirably supplied with energy from the electrical railroad network in the case of a railroad vehicle on which the module is fitted, while heating can be effected by means of electrical heating bars or other suitable heating devices disposed in the module.

In a preferred embodiment of the fixing arrangement according to the invention each positioning rail member can comprise at least two first openings which are each open upwardly in the mounted position of the arrangement. In a preferred configuration each positioning rail member can have three upwardly open openings, corresponding to the three first fixing projections disposed at each of the opposite sides of the module, as referred to hereinbefore.

In another preferred feature at least one second fixing projection is provided laterally beside the respective first opening of the positioning rail member. It has proven to be appropriate if the respective first opening is disposed between two mutually associated second fixing projections.

Depending on the number of first fixing projections at each respective side of the module and the number, corresponding thereto, of upwardly open first openings in the respective positioning rail member, each locking rail member has at least two and preferably three second openings which are each open upwardly in the mounted condition of the arrangement and which, as indicated above, extend in a configuration similar to that of the head of a walking stick or of a generally L-shaped profile. Those second openings are oriented in the same direction on the respective locking rail member.

Laterally beside each second opening each locking rail member has at least one slot, while a preferred feature provides that each second opening is disposed between first and second such slots.

The first and second fixing projections, at their distal end, preferably each have an enlarged head portion while the above-mentioned slots are preferably shaped with a keyhole edge contour having an enlarged end portion adapted to the respective head portion of the fixing projections.

In a preferred configuration of the positioning rail members, each member may have at one end a transverse flange through which a screw extends in the longitudinal direction of the rail. Provided at the corresponding end of the respectively associated locking rail member is a screw nut for receiving the associated screw carried by the respectively co-operating positioning rail member. Each screw and the respectively associated screw nut form the fixing means, by virtue of which the respective locking rail member can be easily and quickly fixed to the associated positioning rail member whereby the autonomous air conditioning module can be simply mounted to the roof of the vehicle and if necessary equally easily and quickly removed therefrom in an on-site position, for example in the case of a railroad vehicle while the vehicle is still on the rails.

Preferably, a number of autonomous air conditioning modules can be arranged on the roof of a rail vehicle by means of fixing arrangements according to the invention so that, in the event of failure of an air conditioning module, the other modules which are fixed on the vehicle roof can continue to operate. Repair to the air conditioning module which is defective does not have to be carried out in a workshop but a module which is in need of repair can be quickly and easily removed from the roof of the vehicle so that replacement of a defective module can be implemented quickly and easily in less than an hour. The module replacement operation can be carried out while the vehicle is still standing on the ordinary railroad rails.

The air conditioning module is operated for example with R 134a as the refrigerant. It is also possible however to use $CO_2$ as the cooling agent. In this connection attention is directed for example to above-mentioned DE 101 61 254 A1, the content of which is hereby appropriately incorporated herein.

The air conditioning modules are preferably employed for passenger compartment air conditioning of rail-mounted vehicles.

Further objects, features and advantages of the present invention will be apparent from the description hereinafter of a preferred embodiment of a fixing arrangement according to the invention.

DESCRIPTION OF THE PREFERRED EMBODIMENT

It will be noted at this juncture that identical features and details are each denoted by the same respective reference in each of FIGS. 1 through 9 so that it will generally not be necessary for all features to be respectively described in detail with reference to all the Figures.

Figure 1:
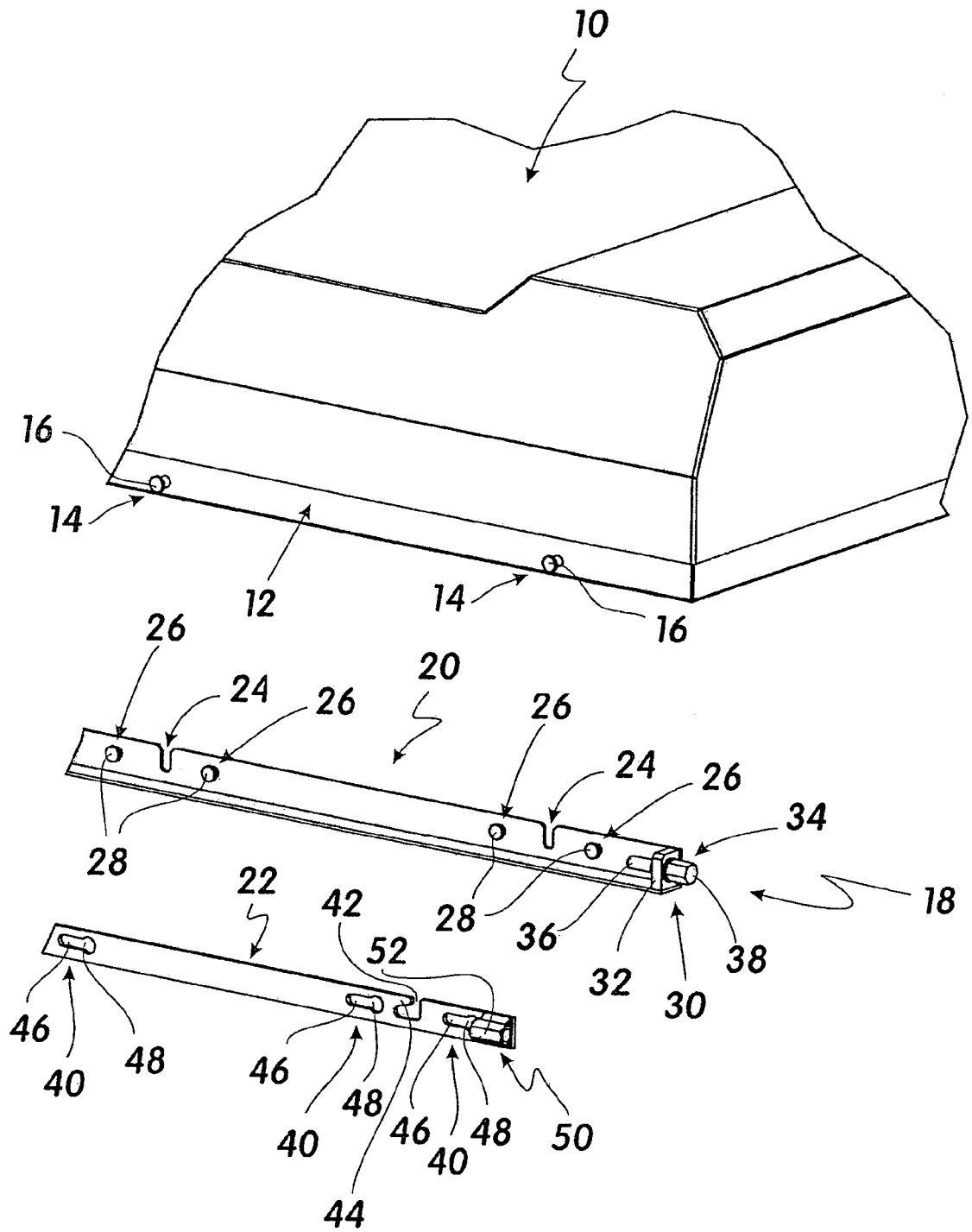
FIG. 1 is an exploded perspective view showing part of an embodiment of the fixing arrangement according to the invention and part of an autonomous air conditioning module.

Reference will first be made to FIG. 1 showing part of a fixing arrangement according to the invention for releasably fixing an air conditioning installation such as for example an autonomous air conditioning module on the roof of a vehicle such as for example a rail-mounted vehicle such as a railroad car (not shown). It will be appreciated that the drawings only show a part of the air conditioning module and one side of the fixing arrangement, with the other side being of a corresponding structure.

Looking therefore at FIG. 1, reference numeral 10 therein denotes the autonomous air conditioning module having two mutually opposite side surfaces of which only one is visible at 12. Reference 14 denotes two first fixing projections which each protrude from the respective side surface 12 of the module 10, which is oriented in the longitudinal direction of the vehicle on which the module 10 is mounted. Each fixing projection 14 has an enlarged head portion 16 at its distal end remote from the side surface 12.

Fixing arrangements of which one is indicated at 18 serve for easily and quickly releasably fixing the autonomous air conditioning module 10 on the roof of the vehicle. The respective fixing arrangement 18 illustrated comprises a positioning rail member 20 and a locking rail member 22. The positioning rail member 20 is of an angled profile and in use of the fixing arrangement 18 is suitably fixed to the roof of the vehicle. As indicated above FIG. 1 illustrates only one of the positioning rail members 20 with its operatively associated locking rail member 22. It will be appreciated that first and second positioning rail members 22 are fixed in mutually parallel relationship on the roof of the vehicle to which the air conditioning module 10 is to be mounted. The positioning rail members 20 will be disposed at a spacing from each other, which is adapted to the spacing between the two side surfaces 20 of the module 10.

The positioning rail member 20 has first recesses or openings 24 which in the mounted position of the positioning rail member 20 are open upwardly, as can be clearly seen from FIG. 1. The spacing between the first openings 24 corresponds to the spacing between the first fixing projections 14. The internal width of the first openings 24 is also suitably adapted to the cross-sectional dimensions of the first fixing projections 14 where the projections 14 fit into the openings 24.

Two second fixing projections 26 project from the positioning rail member 20 on the outside thereof, laterally on respective sides of each first opening 24. The respective second fixing projection 26 has an enlarged head portion 28 at its distal end.

The illustrated positioning rail member 20 has at one end 30 a transverse flange 32 having therein a screwthreaded bore (not identified) through which a screw 34 captively extends. The screw 34 has a screwthread portion 36 and a screw head 38.

The locking rail member 22 associated with the respective positioning rail member 20 has slots 40 which, when the positioning rail member 20 and the locking rail member 22 are in the appropriate co-operating position, are each associated with a respective one of the second fixing projections 26 on the positioning rail member 20, and second openings 42 which are similarly operatively associated with the first openings 24. Only one of the second openings 42 is illustrated in FIG. 1. The openings 42, like the first openings 24 of the respectively associated positioning rail member 20, are open upwardly in the mounted position of the locking rail member. Each of the second openings 42 is of a configuration which can be referred to as a walking stick-like configuration insofar as it comprises a first portion which extends vertically in the FIG. 1 position and a second portion which extends at a right angle at the bottom of the vertical portion, thus extending in the longitudinal direction of the locking rail member 22. This generally L-shaped configuration can be clearly seen from FIG. 1 and thus provides a locking nose 44 at each of the second openings 42.

It will also be seen from FIG. 1 that the slots 40 in each respective locking rail member 22 have a keyhole edge contour as indicated at 46. Each respective slot 40 has an end portion 48 of an enlarged size, which is thus suitably adapted to the respective head portion 28 of the corresponding second fixing projection 26 protruding from the associated positioning rail member 20. A screw nut 52 is suitably fixed to the respective locking rail member 22 at one end thereof. The screwthreaded portion 36 of the screw 34 captively held in the transverse flange 32 of the associated positioning rail member 20 can thus be screwed into the screw nut 52 for securing the positioning rail member 20 and the locking rail member 22 relative to each other.

Figure 2:
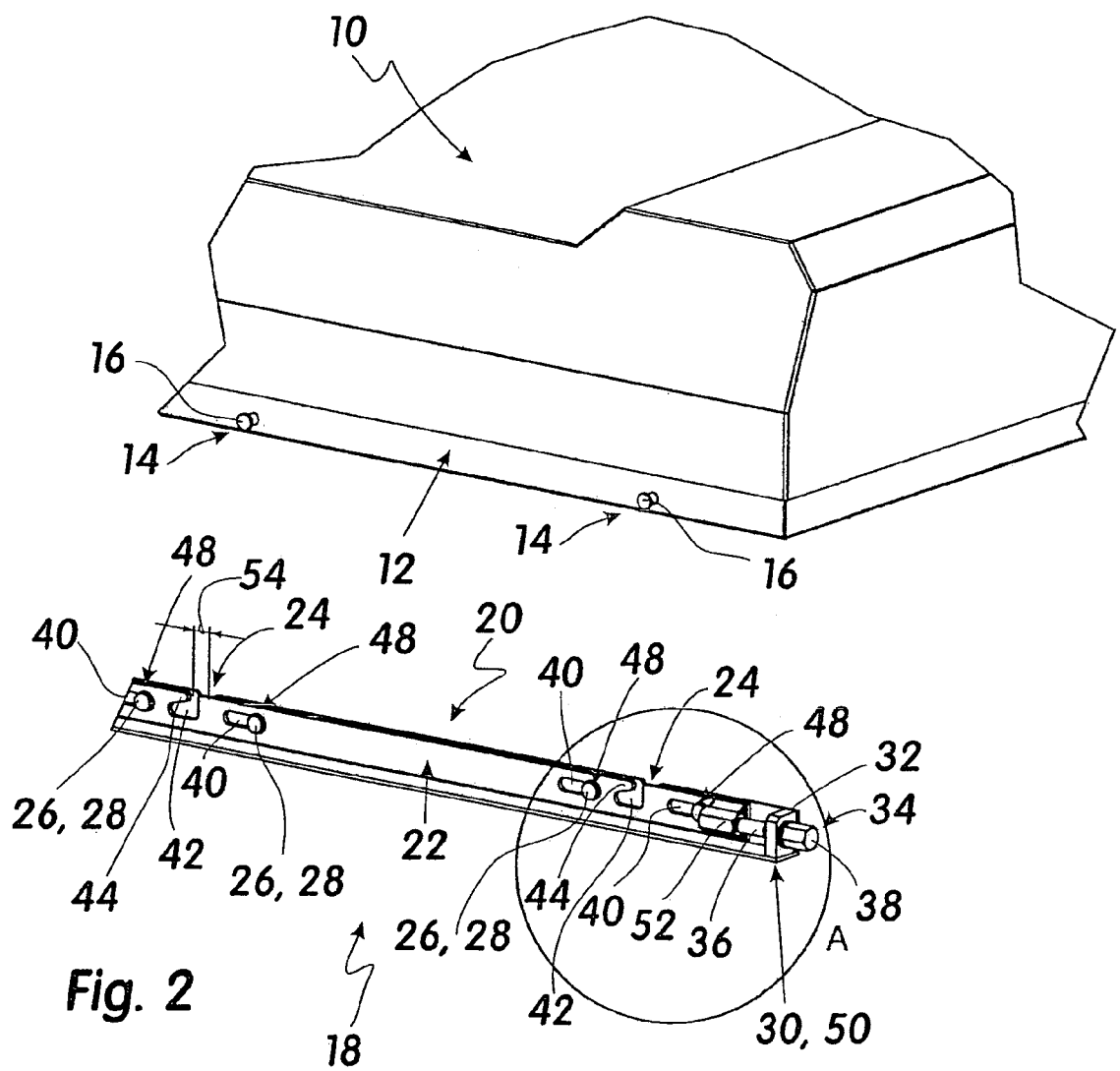
FIG. 2 is a view similar to FIG. 1 with a locking rail member positioned on the associated positioning rail member.
Figure 3:
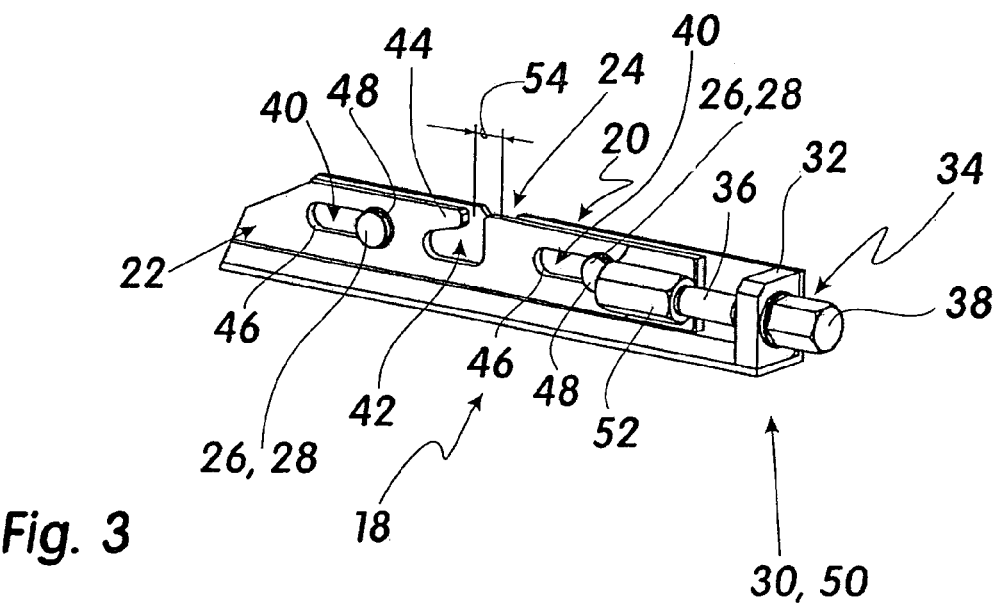
FIG. 3 shows the detail indicated at A in FIG. 2 on a larger scale.

As noted above FIG. 1 shows the autonomous air conditioning module 10, the positioning rail member 20 and the locking rail member 22 in a mutually separate condition. In comparison FIG. 2 shows the fixing arrangement 18 in a condition in which the locking rail member 22 is mounted to the associated positioning rail member 20, with the two rail members 20 and 22 still spaced from the autonomous module 10. In this condition of the components, the second fixing projections 26 on the positioning rail member 20 extend with their enlarged head portions 28 through the enlarged end portions 48 of the slots 40 in the respective locking rail member 22. This represents an intermediate position of the fastening arrangement 18 in which the upwardly open second openings 42 are displaced relative to the also upwardly open first openings 24 of the associated positioning rail member 20. That displacement is identified by reference 54 in FIG. 2.

In this intermediate position of the fixing arrangement 18, the screwthreaded portion of the screw 34 can be screwed into the screw nut 52. This condition can also be clearly seen from FIG. 3 in which the same features and details are denoted by the same references as in FIGS. 1 and 2 so that a further detailed description of the structure is not required.

Figure 4:
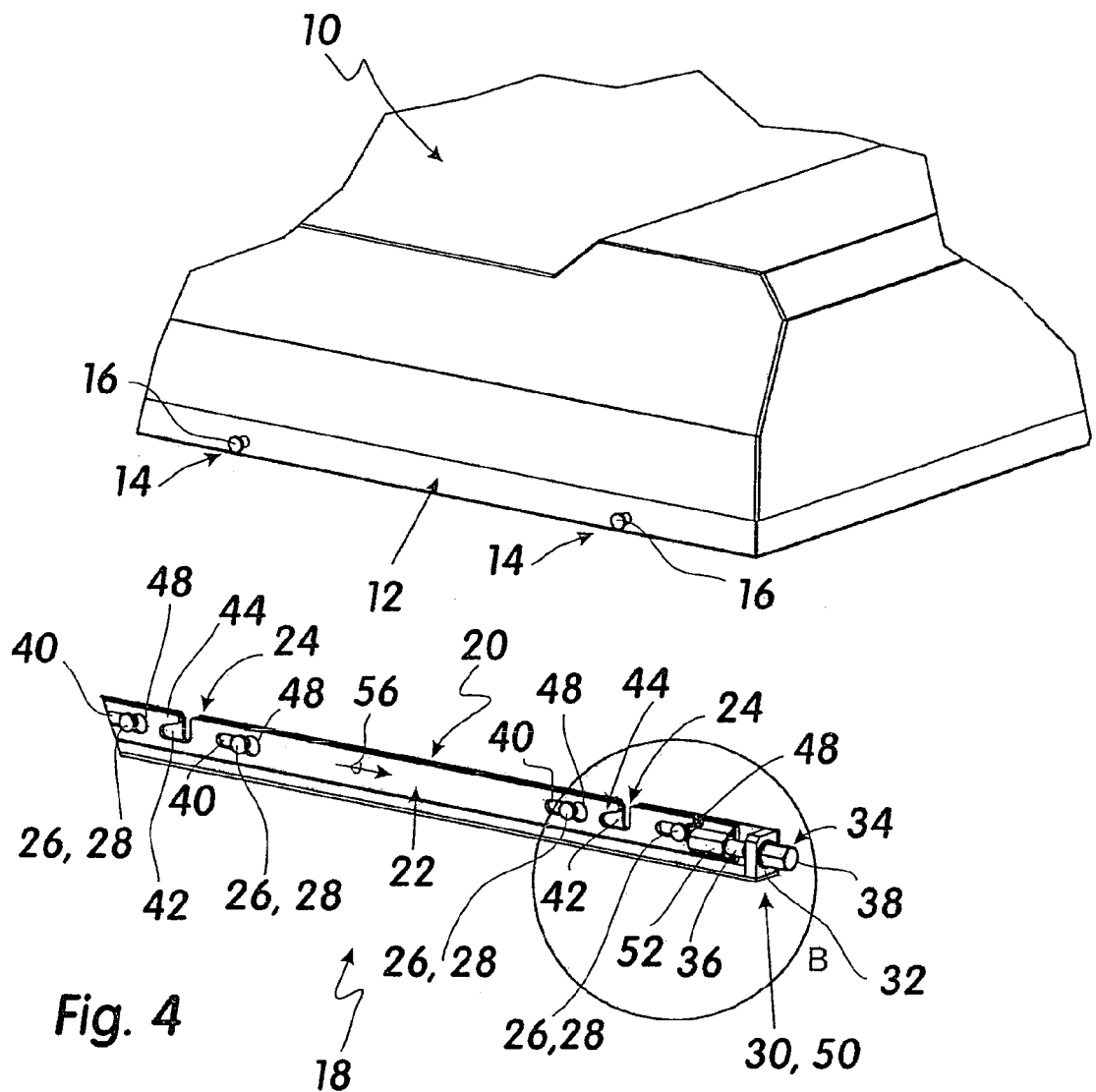
FIG. 4 is a view similar to FIG. 2 with the locking rail member being displaced in a longitudinal direction and positioned on the associated positioning rail member in such a fashion that first and second openings for first fixing projections of the air conditioning module are arranged in mutually aligned relationship.
Figure 5:
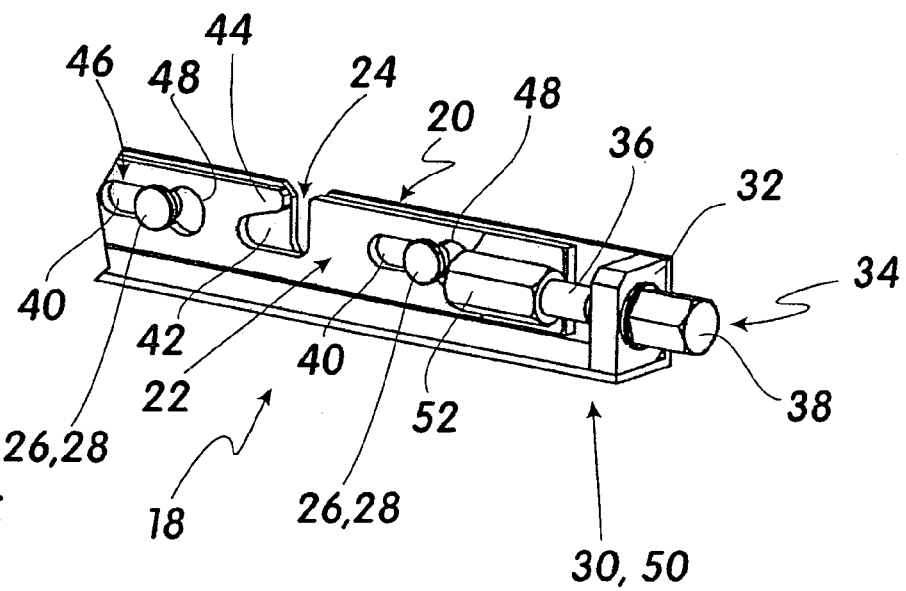
FIG. 5 shows the detail indicated at B in FIG. 4 on a larger scale.

Reference will now be made to FIGS. 4 and 5 showing another intermediate position of the fixing arrangement 18 for the autonomous air conditioning module 10. In this case, the respective locking rail member 22 is displaced in relation to the associated positioning rail member 20 in the longitudinal direction thereof, as indicated by the arrow 56, by means of the screw 34 being screwed in a defined manner into the screw nut 52, in such a way that the displacement indicated at 54 in FIGS. 2 and 3 between each first opening 24 and the associated second opening 42 of the corresponding positioning rail member 20 and the associated locking rail member 22 respectively is eliminated. As a result, the upwardly open first openings 24 of the respective positioning rail member 20 and the upwardly open, generally L-shaped second openings 42 of the operatively associated locking rail member 22 are arranged in coincident relationship so that the autonomous air conditioning module 10 can be disposed on the roof of the vehicle. In this condition the first fixing projections 14 which protrude from the side surfaces 12 of the air conditioning module 10 come to lie in the first and second openings 24 and 42 which are arranged in mutually aligned relationship, as is clearly apparent from FIG. 6 and in particular also from FIG. 7. In that intermediate position the second fixing projections 26 which protrude outwardly from the respective positioning rail member 20 are already disposed in a central part of the respective slots 40 so that in this way also the respective locking rail member 22 is fixed to the associated positioning rail member 20 movably in the direction indicated by the arrow 56.

Figure 6:
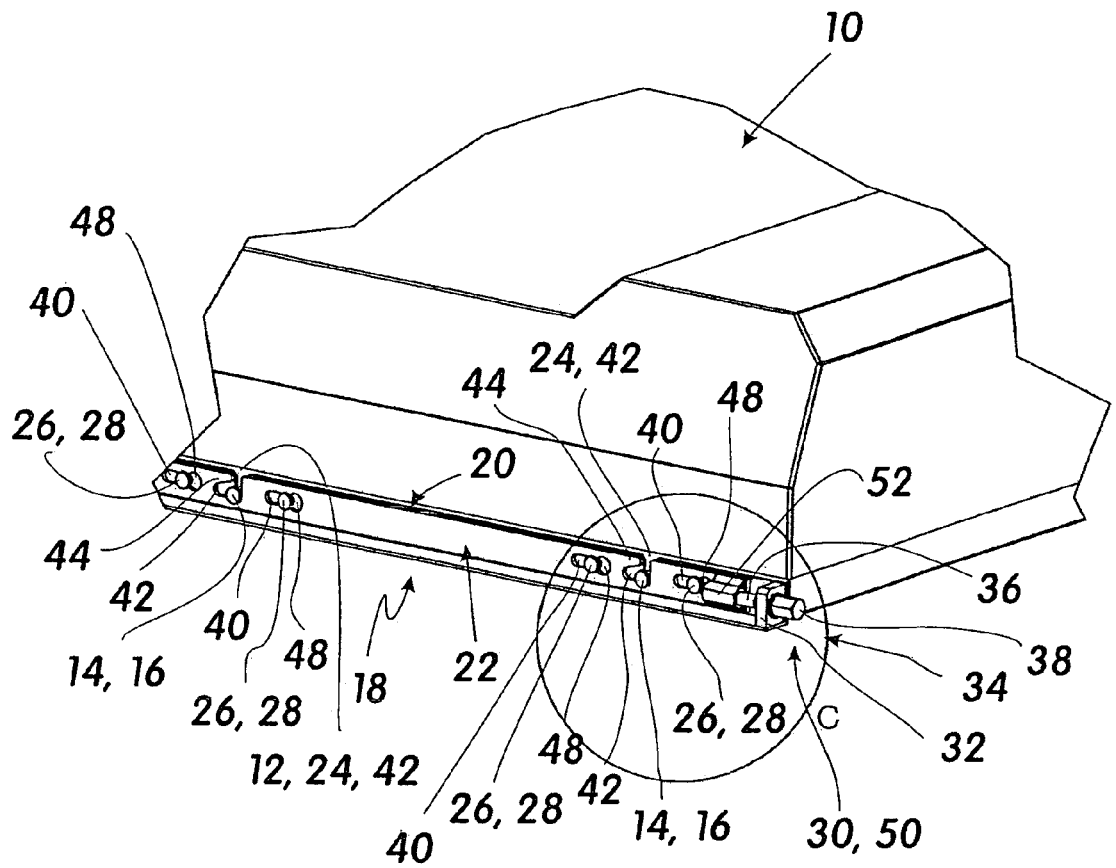
FIG. 6 shows a view similar to FIGS. 2 and 4, wherein the air conditioning module is disposed between first and second positioning rail members and locking rail members assume the position shown in FIGS. 4 and 5 on the positioning rail members.
Figure 7:
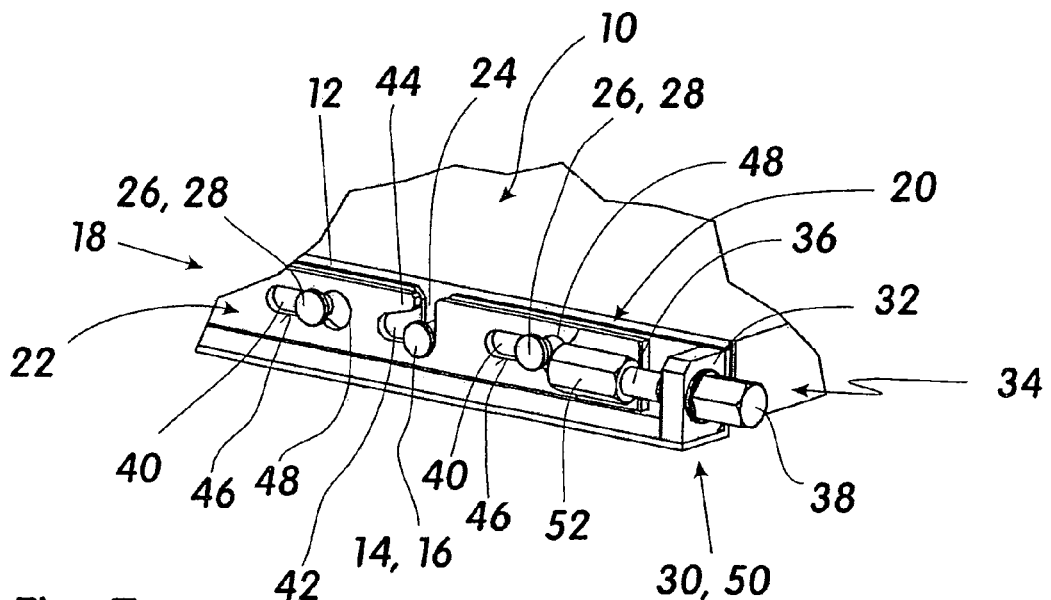
FIG. 7 shows the detail indicated at C in FIG. 6 on a larger scale.

With the components in that condition they can now be presented to the corresponding side surface 12 of the module 10, as can be seen from FIGS. 6 and 7.

Figure 8:
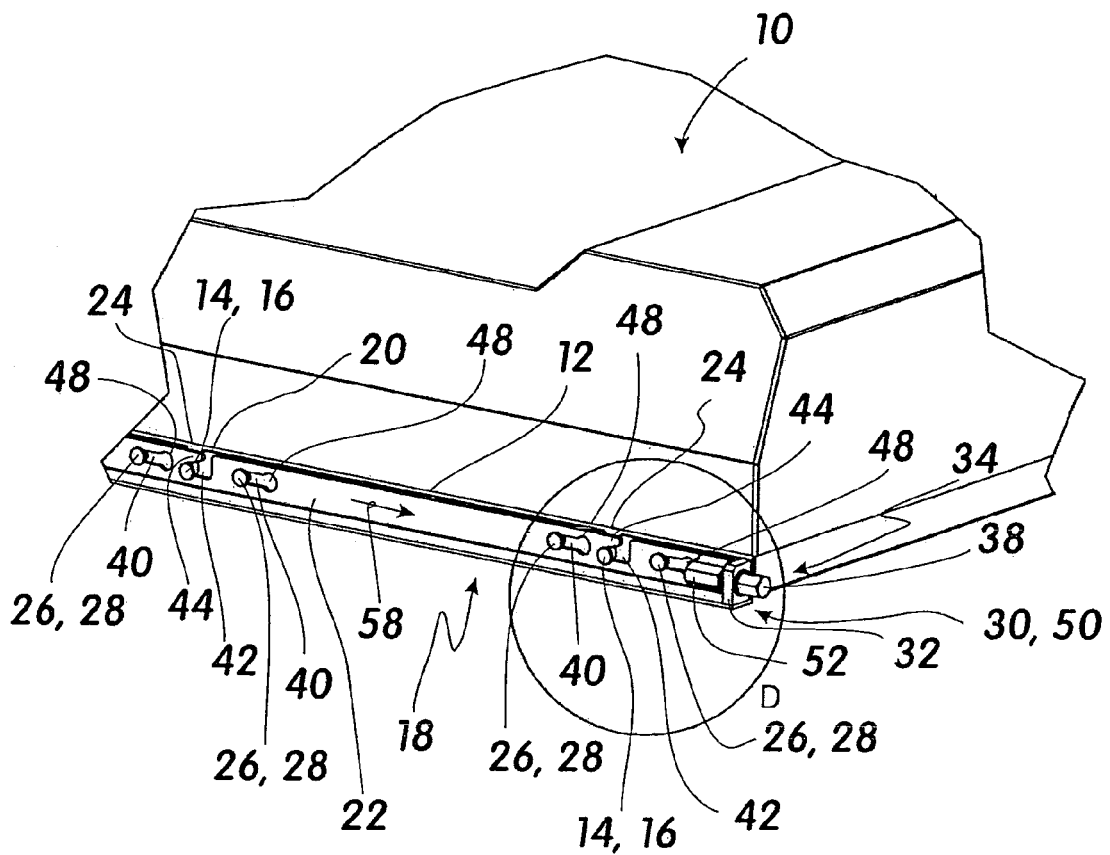
FIG. 8 is a view similar to FIG. 6 showing the locking rail member assuming a locking position on the operatively associated positioning rail member for releasably fixing the air conditioning module to the roof of a rail vehicle which is not shown here.
Figure 9:
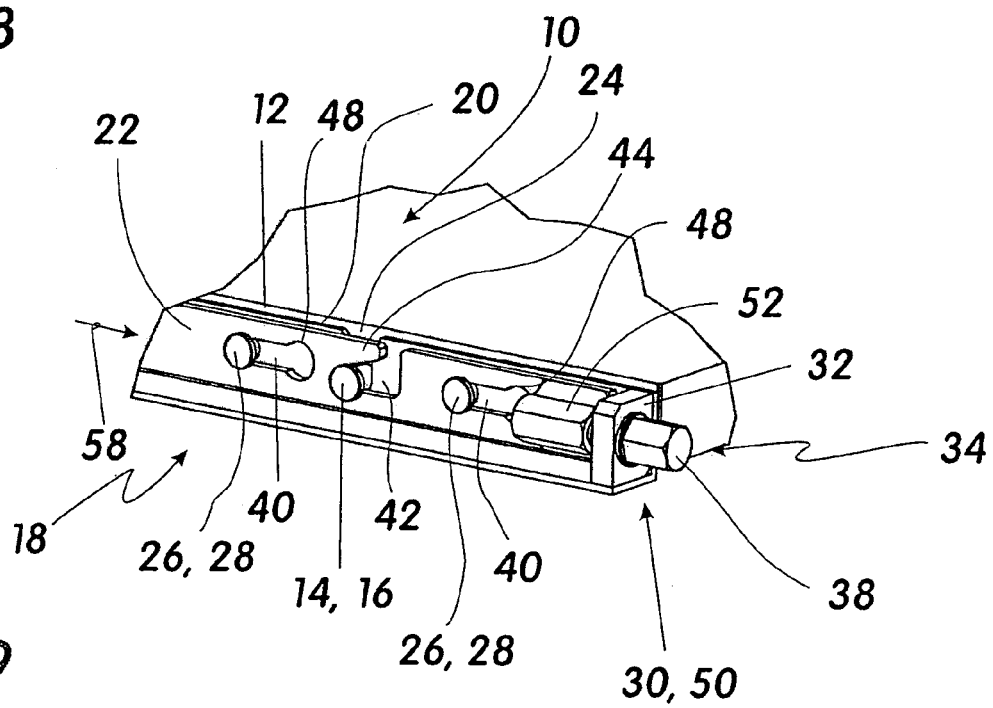
FIG. 9 shows the detail indicated at D in FIG. 8 on a larger scale.

Referring now to FIGS. 8 and 9, if then the screwthreaded portion 36 of the screw 34 is screwed further into the screw nut 52, the corresponding locking rail member 22 moves further in the direction of the arrow indicated at 58 until the respective locking nose 44 fixes the associated first fixing projection 14 in the corresponding first and second openings 24 and 42 of the positioning rail member 20 and the locking rail member 22 respectively.

The procedure involved in removing an air conditioning installation such as the autonomous module 10 illustrated in the drawing from the roof of a vehicle can be carried out in the reverse sequence to that described with reference to FIGS. 2 through 9, and is just as simple and speedy as fixing the module 10 to the roof of the vehicle.

It will be noted that the air conditioning module has at its underside fresh air, circulatory air and air blowing openings (not shown) which can be communicated with roof ducts in the vehicle to which the module is to be mounted.

It will be appreciated that the above-described embodiment of the invention has been set forth solely by way of example and illustration of the principles thereof and that various modifications and alterations may be made therein without thereby departing from the spirit and scope of the invention.

What is claimed is:

1. A releasable fixing arrangement, comprising:
a vehicle roof;
an air conditioning installation having mutually opposite side surfaces comprising and having first fixing projections projecting from the mutually opposite side surfaces of the air conditioning installation;
first and second positioning rail members comprising first openings which are open substantially upwardly in a mounted position of the positioning rail members, and, second fixing projections projecting from said positioning rail members outwardly thereof and located laterally beside said first openings;
means for mounting the positioning rail members on the vehicle roof in mutually parallel relationship at a spacing from each other adapted to the spacing between said side surfaces of said air conditioning installation;
first and second locking rail members adapted to co-operate with respective ones of said positioning rail members, said locking rail members each having slots adapted to be operatively associated with said second fixing projections; and, second openings adapted to be respectively associated with the first openings and which in the mounted position are open upwardly and which extend in an L-shaped configuration; and,
fixing means on the positioning rail members and the locking rail members, operable for releasably securing said first fixing projections in said first openings in said positioning rail members and in said second openings in said locking rail members.

2. A fixing arrangement as set forth in claim 1 and comprising at least two said first fixing projections respectively projecting from each of said mutually opposite side surfaces of the air conditioning installation.

3. A fixing arrangement as set forth in claim 1 wherein in the mounted position the positioning rail members are oriented in the longitudinal direction of the vehicle roof and are of a length adapted to the length of said side surfaces of the air conditioning installation.

4. A fixing arrangement as set forth in claim 3 wherein each respective positioning rail member comprises at least two said first openings.

5. A fixing arrangement as set forth in claim 4 including at least one second fixing projection provided laterally beside each respective first opening.

6. A fixing arrangement as set forth in claim 5 wherein the respective first opening is provided between two associated second fixing projections.

7. A fixing arrangement as set forth in claim 6 wherein each respective locking rail member has at least two said second openings.

8. A fixing arrangement as set forth in claim 7 wherein at least one said slot is disposed laterally beside each respective second opening.

9. A fixing arrangement as set forth in claim 8 wherein each respective second opening is disposed between two said slots.

10. A fixing arrangement as set forth in claim 9 wherein the first and second fixing projections each have a distal end providing a respective enlarged head portion and wherein the slots comprise a keyhole edge contour having an enlarged end portion adapted to the respective head portion of the respective said second fixing projection.

11. A fixing arrangement as set forth in claim 10 wherein each positioning rail member has first and second ends and at the first end a transverse flange, and wherein said fixing means comprise a transverse flange at an end of each respective positioning rail member, a screw extending through said transverse flange in the longitudinal direction of the respective positioning rail element, and a screw nut co-operable with said screw at the end of the respectively associated locking rail member, the arrangement being such that the screw nut and the screw co-operate with each other for fixing the positioning rail member and the operatively associated locking rail member with respect to each other.

12. A fixing arrangement as set forth in claim 1 wherein said second openings are each of a generally L-shaped configuration comprising a first portion which in the mounted position extends substantially vertically and a second portion extending substantially in the longitudinal direction of the respective locking rail member.

* * * * *